(12) United States Patent
Piper et al.

(10) Patent No.: US 7,100,822 B2
(45) Date of Patent: Sep. 5, 2006

(54) LOTTERY SYSTEM

(75) Inventors: James William Piper, Auckland (NZ); Glen David Smith, Auckland (NZ)

(73) Assignee: Cool 123 Limited, Auckland (NZ)

( * ) Notice: Subject to any disclaimer, the term of this patent is extended or adjusted under 35 U.S.C. 154(b) by 0 days.

(21) Appl. No.: 10/472,451

(22) PCT Filed: Mar. 22, 2002

(86) PCT No.: PCT/NZ02/00038

§ 371 (c)(1),
(2), (4) Date: Sep. 23, 2003

(87) PCT Pub. No.: WO02/077931

PCT Pub. Date: Oct. 3, 2002

(65) Prior Publication Data

US 2004/0097283 A1    May 20, 2004

(30) Foreign Application Priority Data

Mar. 23, 2001  (NZ) .................................... 510723

(51) Int. Cl.
*G06F 7/08*    (2006.01)
(52) U.S. Cl. ..................... 235/381; 235/487
(58) Field of Classification Search ........... 235/381, 235/487; 463/16, 17, 26, 43, 15; 273/269
See application file for complete search history.

(56) References Cited

U.S. PATENT DOCUMENTS

| | | | | |
|---|---|---|---|---|
| 3,869,124 A | * | 3/1975 | Stein et al. ................. | 273/242 |
| 5,497,990 A | | 3/1996 | Nanni ........................ | 463/18 |
| 5,836,816 A | * | 11/1998 | Bruin et al. ................. | 463/16 |
| 5,988,499 A | | 11/1999 | Sisca ......................... | 235/419 |
| 6,004,206 A | * | 12/1999 | Fabri ......................... | 463/17 |
| 6,098,979 A | | 8/2000 | Rogers ...................... | 273/138.1 |
| 6,416,414 B1 | | 7/2002 | Stadelmann ................ | 463/42 |
| 6,688,976 B1 | * | 2/2004 | Tulley et al. ................ | 463/17 |

FOREIGN PATENT DOCUMENTS

| WO | WO 98/52660 | 11/1998 |
|---|---|---|
| WO | WO 99/06128 | 2/1999 |

OTHER PUBLICATIONS http://www.centralconnector.com/GAMES/boggle.html—Boggle—Parker Brothers—1973.
http://zone.msn.com/boggle/start.asp?hb=f—Online boggle—Hasbro Interactive—1998.

* cited by examiner

*Primary Examiner*—Thien M. Le
*Assistant Examiner*—Kumiko C. Koyama
(74) *Attorney, Agent, or Firm*—Young & Thompson

(57) ABSTRACT

A computer based lottery which allows entries to be sold over the telephone, by ATM or POS machines, by email, or via kiosks, in which participants are invited to choose at least one unique number from a defined range of numbers, e.g. between one and one million which hopefully no-one else has or will select before the end of the competition. The participant can register their selection with an entry-logging engine (which can be an automated call answering system allowing the user to key in the number chosen by using the telephone keypad). This records the identity or contact details of the participant (for example telephone number or email address), the number selected by the participant, and the date and time of the entry, the entry-logging engine giving the participant an optional receipt number.

17 Claims, 7 Drawing Sheets

| number | 1st | 2nd | 3rd | 4th | 5th |
|---|---|---|---|---|---|
| 1300 | x | | | | |
| 1301 | x | x | x | x | |
| 1302 | x | x | | | |
| 1303 | | | | | |
| 1304 | x | x | | | |
| 1305 | | | | | |
| 1306 | x | x | x | | |
| 1307 | x | x | x | x | x |
| 1308 | x | x | x | x | |
| 1309 | x | x | x | | |
| 1310 | x | x | | | |

| number | 1st | 2nd | 3rd | 4th | 5th |
|---|---|---|---|---|---|
| 1300 | x | | | | |
| 1301 | x | x | x | x | |
| 1302 | x | x | | | |
| 1303 | | | | | |
| 1304 | x | x | | | |
| 1305 | | | | | |
| 1306 | x | x | x | | |
| 1307 | x | x | x | x | x |
| 1308 | x | x | x | x | |
| 1309 | x | x | x | | |
| 1310 | x | x | | | |

FIGURE 1

| number | 1st | 2nd | 3rd | 4th | 5th |
|---|---|---|---|---|---|
| 1300 | x | y | | | |
| 1301 | x | x | x | x | y |
| 1302 | x | x | | | |
| 1303 | y | | | | |
| 1304 | x | x | y | | |
| 1305 | | | | | |
| 1306 | x | x | x | y | y |
| 1307 | x | x | x | x | x |
| 1308 | x | x | x | x | |
| 1309 | x | x | x | | |
| 1310 | x | x | y | | |

FIGURE 2

| number | 1st | 2nd | 3rd | 4th | 5th |
|--------|-----|-----|-----|-----|-----|
| 1300 | x | y | | | |
| 1301 | x | x | x | x | y |
| 1302 | x | x | | | |
| 1303 | y | | | | |
| 1304 | x | x | y | z | |
| 1305 | z | | | | |
| 1306 | x | x | x | y | y |
| 1307 | x | x | x | x | x |
| 1308 | x | x | x | x | |
| 1309 | x | x | x | | |
| 1310 | x | x | y | z | |

FIGURE 3

| number | 1st | 2nd | 3rd | 4th | 5th | |
|--------|-----|-----|-----|-----|-----|---|
| 1300 | x | y | a | | | |
| 1301 | x | x | x | x | y | |
| 1302 | x | x | | | | |
| 1303 | y | | | | | winner |
| 1304 | x | x | y | z | | |
| 1305 | z | c** | | | | |
| 1306 | x | x | x | y | y | |
| 1307 | x | x | x | x | x | |
| 1308 | x | x | x | x | | |
| 1309 | x | x | x | b | | |
| 1310 | x | x | y | z | | |

| HITS | HORSE | STATUS |
|------|-------|--------|
| 0 | 1 | No Jockey |
| 0 | 2 | No Jockey |
| 0 | 3 | No Jockey |
| 0 | 4 | No Jockey |
| 0 | 5 | No Jockey |
| 0 | 6 | No Jockey |
| 0 | 7 | No Jockey |
| 0 | 8 | No Jockey |
| 0 | 9 | No Jockey |
| 0 | 10 | No Jockey |

Prizes — caller ID
Winner
Last Scratching
Last Caller
Last Jockey

| | |
|---|---|
| Bets | 0 |
| No Jockey | 10 |
| Horses Racing | 0 |
| Scratched | 0 |
| Winner | Not Yet |
| Profit after Prize(s) | Not Yet |
| Prize Value | $10 |

Horse ID: 4
Game duration 0:00:00
Bet Cost: $1

FIGURE 8

| HITS | HORSE | STATUS |
|------|-------|--------|
| 1 | 1 | Racing >>> |
| 2 | 2 | Scratched |
| 0 | 3 | No Jockey |
| 2 | 4 | Scratched |
| 3 | 5 | Scratched |
| 0 | 6 | No Jockey |
| 4 | 7 | Scratched |
| 0 | 8 | No Jockey |
| 1 | 9 | Racing >>> |
| 2 | 10 | Scratched |

Prizes — caller ID
Winner
Last Scratching
Last Caller
Last Jockey

| | |
|---|---|
| Bets | 15 |
| No Jockey | 3 |
| Horses Racing | 2 |
| Scratched | 5 |
| Winner | Not Yet |
| Profit after Prize(s) | $5 |
| Prize Value | $10 |

Horse ID: 1
Game duration 0:00:19
Bet Cost: $1

| HITS | HORSE | STATUS | Prizes | caller ID |
|---|---|---|---|---|
| 1 | 1 | Racing >>> | Winner | 21620410 |
| 10 | 2 | Scratched | Last Scratching | 21678658 |
| 3 | 3 | Scratched | Last Caller | 21678658 |
| 11 | 4 | Scratched | Last Jockey | 21651046 |
| 5 | 5 | Scratched | | |
| 7 | 6 | Scratched | Bets | 65 |
| 11 | 7 | Scratched | No Jockey | 0 |
| 2 | 8 | Scratched | Horses Racing | 1 |
| 11 | 9 | Scratched | Scratched | 9 |
| 4 | 10 | Scratched | Winner | 1 |

Horse ID 8

Pay out $10 to Winner !!!
Profit after Prize(s) $55  Game duration 0:01:10
Prize Value $10  Bet Cost $1

FIGURE 9

| Caller ID | Date | Time | Horse | Status | n-Racing | n-Horses not picked | |
|---|---|---|---|---|---|---|---|
| 21637816 | 21/03/2002 | 3:54:56 p.m. | 9 | Racing >>> | 1 | 9 | |
| 21697162 | 21/03/2002 | 3:54:57 p.m. | 10 | Racing >>> | 2 | 8 | |
| 21687853 | 21/03/2002 | 3:54:58 p.m. | 2 | Racing >>> | 3 | 7 | |
| 21629164 | 21/03/2002 | 3:55:01 p.m. | 5 | Racing >>> | 4 | 6 | |
| 2165801 | 21/03/2002 | 3:55:02 p.m. | 5 | Eliminated | 3 | 6 | |
| 21686967 | 21/03/2002 | 3:55:03 p.m. | 7 | Racing >>> | 4 | 5 | |
| 21694135 | 21/03/2002 | 3:55:04 p.m. | 10 | Eliminated | 3 | 5 | |
| 21651141 | 21/03/2002 | 3:55:05 p.m. | 2 | Eliminated | 2 | 5 | |
| 21659417 | 21/03/2002 | 3:55:06 p.m. | 4 | Racing >>> | 3 | 4 | |
| 21682595 | 21/03/2002 | 3:55:07 p.m. | 7 | Eliminated | 2 | 4 | |
| 21630073 | 21/03/2002 | 3:55:08 p.m. | 5 | Eliminated | 2 | 4 | |
| 21692160 | 21/03/2002 | 3:55:09 p.m. | 4 | Eliminated | 1 | 4 | |
| 21632075 | 21/03/2002 | 3:55:10 p.m. | 7 | Eliminated | 1 | 4 | |
| 21659982 | 21/03/2002 | 3:55:11 p.m. | 7 | Eliminated | 1 | 4 | |
| 21620410 | 21/03/2002 | 3:55:12 p.m. | 1 | Racing >>> | 2 | 3 | |
| 21614136 | 21/03/2002 | 3:55:13 p.m. | 2 | Eliminated | 2 | 3 | |
| 21679480 | 21/03/2002 | 3:55:14 p.m. | 9 | Eliminated | 1 | 3 | |
| 21685564 | 21/03/2002 | 3:55:15 p.m. | 4 | Eliminated | 1 | 3 | |
| 21678381 | 21/03/2002 | 3:55:16 p.m. | 4 | Eliminated | 1 | 3 | |
| 21674896 | 21/03/2002 | 3:55:17 p.m. | 2 | Eliminated | 1 | 3 | |
| 21651532 | 21/03/2002 | 3:55:18 p.m. | 2 | Eliminated | 1 | 3 | |
| 21663045 | 21/03/2002 | 3:55:19 p.m. | 2 | Eliminated | 1 | 3 | |
| 21660193 | 21/03/2002 | 3:55:20 p.m. | 5 | Eliminated | 1 | 3 | |
| 21617198 | 21/03/2002 | 3:55:21 p.m. | 7 | Eliminated | 1 | 3 | |
| 21625474 | 21/03/2002 | 3:55:22 p.m. | 9 | Eliminated | 1 | 3 | |
| 21621742 | 21/03/2002 | 3:55:23 p.m. | 7 | Eliminated | 1 | 3 | |
| 21685838 | 21/03/2002 | 3:55:24 p.m. | 10 | Eliminated | 1 | 3 | |
| 21657925 | 21/03/2002 | 3:55:26 p.m. | 9 | Eliminated | 1 | 3 | |
| 21697840 | 21/03/2002 | 3:55:27 p.m. | 2 | Eliminated | 1 | 3 | |
| 2168482 | 21/03/2002 | 3:55:28 p.m. | 7 | Eliminated | 1 | 3 | |
| 21687639 | 21/03/2002 | 3:55:29 p.m. | 8 | Racing >>> | 2 | 2 | |
| 21681366 | 21/03/2002 | 3:55:30 p.m. | 6 | Eliminated | 1 | 2 | |
| 21626383 | 21/03/2002 | 3:55:31 p.m. | 8 | Eliminated | 1 | 2 | |
| 21685909 | 21/03/2002 | 3:55:32 p.m. | 7 | Eliminated | 1 | 2 | |
| 21696728 | 21/03/2002 | 3:55:33 p.m. | 7 | Eliminated | 1 | 2 | |
| 21685534 | 21/03/2002 | 3:55:34 p.m. | 4 | Eliminated | 1 | 2 | |
| 21672171 | 21/03/2002 | 3:55:35 p.m. | 5 | Eliminated | 1 | 2 | |
| 21644607 | 21/03/2002 | 3:55:36 p.m. | 2 | Eliminated | 1 | 2 | |
| 21660505 | 21/03/2002 | 3:55:37 p.m. | 9 | Eliminated | 1 | 2 | |
| 21644069 | 21/03/2002 | 3:55:38 p.m. | 6 | Eliminated | 1 | 2 | |
| 21698836 | 21/03/2002 | 3:55:39 p.m. | 9 | Eliminated | 1 | 2 | |
| 21621761 | 21/03/2002 | 3:55:40 p.m. | 2 | Eliminated | 1 | 2 | |
| 21685857 | 21/03/2002 | 3:55:41 p.m. | 4 | Eliminated | 1 | 2 | |
| 21657844 | 21/03/2002 | 3:55:42 p.m. | 4 | Eliminated | 1 | 2 | |
| 21671302 | 21/03/2002 | 3:55:43 p.m. | 2 | Eliminated | 1 | 2 | |
| 2167163 | 21/03/2002 | 3:55:44 p.m. | 7 | Eliminated | 1 | 2 | |
| 21672246 | 21/03/2002 | 3:55:45 p.m. | 4 | Eliminated | 1 | 2 | |
| 21626920 | 21/03/2002 | 3:55:46 p.m. | 9 | Eliminated | 1 | 2 | |
| 21629884 | 21/03/2002 | 3:55:47 p.m. | 3 | Racing >>> | 2 | 1 | |
| 21622000 | 21/03/2002 | 3:55:48 p.m. | 4 | Eliminated | 2 | 1 | |
| 21682165 | 21/03/2002 | 3:55:49 p.m. | 9 | Eliminated | 2 | 1 | |
| 21677171 | 21/03/2002 | 3:55:50 p.m. | 4 | Eliminated | 2 | 1 | |
| 21619155 | 21/03/2002 | 3:55:51 p.m. | 9 | Eliminated | 2 | 1 | |
| 21618381 | 21/03/2002 | 3:55:52 p.m. | 7 | Eliminated | 2 | 1 | |
| 21693827 | 21/03/2002 | 3:55:53 p.m. | 9 | Eliminated | 2 | 1 | |
| 2169960 | 21/03/2002 | 3:55:54 p.m. | 6 | Eliminated | 2 | 1 | |
| 21651046 | 21/03/2002 | 3:55:55 p.m. | 8 | Racing >>> | 3 | 0 | picked last free Horse |
| 21688334 | 21/03/2002 | 3:55:56 p.m. | 3 | Eliminated | 2 | 0 | |
| 21619778 | 21/03/2002 | 3:55:57 p.m. | 9 | Eliminated | 2 | 0 | |
| 21641212 | 21/03/2002 | 3:55:58 p.m. | 3 | Eliminated | 2 | 0 | |
| 21613917 | 21/03/2002 | 3:55:59 p.m. | 6 | Eliminated | 2 | 0 | |
| 21682715 | 21/03/2002 | 3:56:00 p.m. | 6 | Eliminated | 2 | 0 | |
| 21647798 | 21/03/2002 | 3:56:01 p.m. | 4 | Eliminated | 2 | 0 | |
| 21647756 | 21/03/2002 | 3:56:02 p.m. | 10 | Eliminated | 2 | 0 | |
| 21676658 | 21/03/2002 | 3:56:03 p.m. | 8 | Eliminated | 1 | 0 | Eliminated 2nd to last Horse |

FIGURE 10

LOTTERY SYSTEM

FIELD

This invention relates to a gambling or promotion system enabling a large number of players to participate, and in particular lends itself to a game in which participants can enter by means of the telephone, or by email.

BACKGROUND

Lotteries are used in gambling systems where participants pay to enter or promotional systems where eligibility to enter is associated with the purchase of goods or services.

Most games of chance involving large numbers of participants are lotteries based on (a) sweepstakes, in which customers purchase lottery tickets, or (b) variants of LOTTO or KENO, in which customers either purchase a pre-allocated set of numbers, or purchase a group of numbers chosen by them in each case purchasing a ticket at a retail outlet. In some cases such purchases are conducted by mail. In all cases the organiser of the lottery will then select the winning numbers, in some form of random draw, which is often televised.

One disadvantage of these systems is that customers need to go to the retail out let to purchase the entrance ticket. Another disadvantage is that customers are required to retain their tickets, in order to redeem prizes if they believe they have won. LOTTO allows customers to select different numbers but suffers from the disadvantage that the prize pool may be shared between a number of participants—it is the nature of LOTTO that it cannot guarantee a single division one winner. Another disadvantage is the need to ensure that the selection of the winning tickets/numbers is truly random and is not subject to interference or fraud by any party.

OBJECT

It is an object of this invention to provide a novel lottery system, which makes it possible for customers to enter by means of the telephone, or the Internet, or one which will at least provide the public with a useful choice.

STATEMENT OF THE INVENTION

In one aspect, the invention provides a computerised lottery having at least one computer system for recording entries and determining one or more winners, in which participants are invited to select at least one number from a defined range of n numbers, and to register their selection with the computer, the computer being capable of recording at least the identity or contact details of the participant, the number selected by the participant, the rules of the competition being such that participants are aware that the competition will run until a winner is declared, but that more than one selection of the same number by more than one participant or entry will prevent that number from being chosen for a primary prize, the competition running until either: (a) a defined time has expired to determine one or more winners based on the participants who had selected numbers that other participants had not selected; or (b) until all but one of the numbers have been selected two or more times, and only one number remains having been selected by only one participant with that final number being declared the number, and the participant having chosen that number being notified as the winner.

In another aspect the invention provides a method of conducting a lottery, in which participants are invited to select at least one number from a defined range of numbers, for example between one and n, to register their selection with a computer system, the computer system being capable of recording at least the identity or contact details of the participant, the number selected by the participant, and preferably the date and time of the entry, the rules of the competition being such that participants are aware that the competition will run until a winner is declared, but that more than one selection of the same number by more than one participant or entry will prevent that number from being chosen as the primary winning entry, the competition running until either a defined time has expired, or more preferably until all but one of the numbers have been selected two or more times, and only one number remains having been selected by only one participant, with that final number being declared the winning number, and the participant having chosen that number being notified as the winner.

Preferably the computer system includes a transaction engine (i.e. for entry logging) and a lottery engine. More preferably this includes at least one database with each record having fields containing (a) customer information, typically a telephone number or credit card number, (b) the number chosen by the customer, (c) a receipt number or PIN disclosed to the customer as proof of that entry.

More preferably the lottery engine includes at least one database. The database can contain n records with at least two fields per record—a first field containing a number within the range (so that the records can be sequential through the entire range of n numbers for that competition), and a second numerical field capable of recording the number of "hits" or number of times that number has been selected.

The databases of the transaction engine and lottery engine can be combined into a single database and operated within a single computer but we believe that this may make it more vulnerable to fraud.

Alternatively the lottery can be run using a spreadsheet instead of separate databases, as we used a spreadsheet in our simulation of the invention. Preferably the participant is allowed to enter their own number by remote data entry such as by entering it on a telephone key pad, by sending an SMS message, or email message containing the number they have chosen. However, it is also possible for the participant to allow the system to chose one or more numbers at random, so that the participant could for example select a "lucky dip" in which the system would select one or more numbers at random and enter them into the competition for the participant.

Preferably the registration process involves the participant paying for their entry. However, in some lottery schemes, the entry may be free, with a defined prize for the entry.

In its most preferred form the competition will run until there is only one number remaining all other numbers in the set of n numbers having been excluded by the lottery engine (a computer program which preferably determines number matches, as numbers are entered), and reducing the pool of potential winning numbers until only a single number remains in that pool.

It will be appreciated that in some cases the competition may run for a period of time, leaving a number of potential winning numbers, and a number of "blank" numbers, i.e. potential members of the set of n numbers which have not been chosen by anyone. In which case the promoters of the competition may wish to close the competition after a defined period of time, or after a defined number of entries, and then analysing the results to determine if there should be one or more first division winners, being participants who have selected a number that has not been selected by anyone else, and one or more second or third division winners based on numbers that have been chosen by two or more participants.

As will be appreciated from the examples, there are a number of ways of operating such a lottery.

One of the advantages of this lottery system is that it can be operated via the telephone, for example by utilising a 0900 number ordering system. If, for example "n" is chosen as one million, then the set of numbers consists of the digits from 1 to 1,000,000 (this number range is purely arbitrary depending upon the size of the competition and the potential prize pool) then the participant can respond to an advertisement perhaps on television, on the radio, or in the printed media, by calling a defined telephone number and then at the prompt entering the number via a touch-tone keypad. Alternatively the number could be entered using an interactive voice recognition system, by speaking the number, and having the computer, or a human operator, repeat the number back to the participant. It is however preferred that the operation of the system is fully computerised, and that either a touch-tone keypad can be used, or an interactive voice recognition system be used (IVR) as this enables the system to be readily scalable, and to operate at relatively low cost (in terms of human operators) 24 hours a day.

Alternatively the system cam be operated via a message sent in many ways including by mail, by fax, by email, by SMS or WAP, or by logging into a server on the internet, by machine such as a gaming machine, kiosk, lottery terminal, ATM or POS machine, or through a registration process, or via telephone with participants having pre-registered. In either of these cases the participants may have purchased a number of potential entries in advance, or established a credit balance with the operator, or may wish to pay by credit card, or some other rapid payment system.

One of the advantages of the system is that the identity of the winning number will not be known in advance, and providing that the computer system is isolated from hackers, or from programmers or operators of the system, the lottery engine can be allowed to run until all the available numbers have been used up except for the winning number, the identity of which will only be revealed at the time of completion of the lottery, and that time will not be known by the operator, until at least (2n−1) entries have been made, and more likely many more entries than this. This means that for a set of numbers n, the potential revenue (excluding operating costs, and any charges of the 0900 system payable to the carrier) will be at least $(2n−1)× entry price, and could well be much more if some numbers are chosen many times over by different participants.

In another aspect the invention provides a computer system including computer hardware and appropriate software to run the transaction engine and the lottery engine in accordance with the method outlined above, and means for allowing the automated input of information to the lottery engine.

Preferably the transaction engine is separate from the lottery engine and passes registered entries sequentially to the lottery engine.

Preferably to input to the transaction engine involves entries via a telephone keypad via SMS from mobile phones, via emails, via entries direct to a website, or entries direct to a kiosk or computer terminal at a retail outlet, and less preferably by mail (as this would involve scanning of the entry or human input of the entry and reduces the ability to provide an instantaneous or rapid response to the entrant confirming the details of the entry).

In another aspect the invention provides a computer program for conducting a lottery in which participants are invited to select at least one number from a defined range of "n" numbers, and to register their selection with a computer running the program, the program adapted to record at least the identity or contact details of the participant, the number selected by the participant, and to separately record the number of times each number within the range of "n" numbers is chosen by participants, the program allowing the competition to run until all but one of the numbers have been selected two or more times, and only one number remains having been selected by only one participant, with that final number being declared the winning number.

INVENTIVE STEP

The invention as claimed allows a lottery to operate using a totaliser system—the total prize pool depends upon the number of entries, and in its simplest form the competition will not close until at least 2n−1 entries have been received where n is the total of the numbers to be chosen. Interference or fraud is minimised as the outcome is determined by the interaction between the participant's entries rather than the drawing of a ticket or the selection of numbered balls or the like. It also allows entries to be made remotely e.g. by telephone or email without the need for a pre-printed ticket.

DRAWINGS

These and other aspects of this invention, which will be considered in all its novel aspects, will become apparent from the following description, which is given by way of example only, with reference to the accompanying drawings in which:

FIG. 1 illustrates a table of ten numbers taken out of a potential group of n numbers, a time t1.

FIG. 2 we show a snapshot of the same group of numbers at time t2.

FIG. 3 we show a snapshot of the same group of numbers at time t3.

FIG. 4 we show a snapshot of the same group of numbers at time t4, when a winner number is declared.

FIG. 7 is a horse race simulation, based on a lottery of ten numbers, showing the processing screen prior to starting.

FIG. 8 shows the same screen after 15 entries, before a winner has been declared.

FIG. 9 shows the screen when the lottery has been completed, and a winner declared. In this case horse number 1 is the winner.

FIG. 10 is the call log showing the date and time of the different entries.

BRIEF OVERVIEW OF THE DRAWINGS

Figure 5:
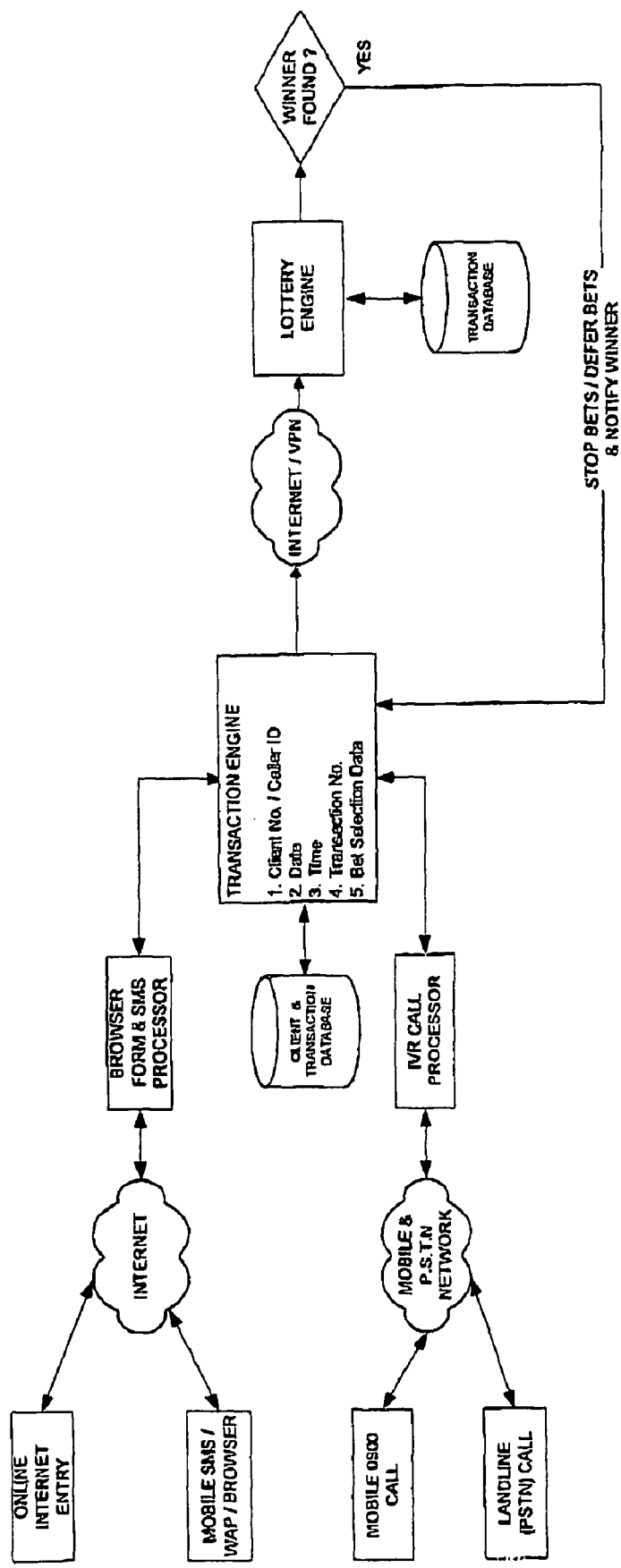
FIG. 5 is a basic overview of the transaction process, whether or not the entry comes via a telephone landline, or by an Internet entry, or some other means.

FIG. 1 illustrates a table of ten numbers taken out of a potential group of n numbers, in this example the numbers from 1 to 1,000,000. The numbers 1300 to 1310 are shown in the first column and the number of hits against each number are recorded in the next five columns. In FIG. 1 the hits are recorded with a x.

This figure does not show the order in which the caller information is transmitted, or received by the lottery engine it is simply a snapshot of those numbers at a particular point in time during the lottery process.

As will be explained below, numbers are buffered as they are entered by each participant and then fed sequentially to the lottery engine from an appropriate PIPO (first-in-first-out) stack.

It will be noted that several of these numbers have been chosen by more than one participant, and thus for the purpose of the first division prize they will be excluded from the pool of available lottery numbers, although the participants will not be notified of this, at any stage during the lottery.

In FIG. 2 we show a snapshot of the same group of numbers at a later time, where a number of entries y have been recorded against the various numbers. It will be noted that some of the numbers which had previously been excluded (for example numbers 1301, 1304, 1306 and 1310), have been chosen by additional participants.

Number 1300, which was a potential winner in the snapshot shown in FIG. 1, has now been excluded in the snapshot of FIG. 2. FIG. 2 shows that number 1303 is a potential winner, although number 1305 is still a blank entry (no participant has chosen this number).

By snapshot 3 of FIG. 3, the entries z, have for example been applied against numbers 1304, 1305 and 1310. Numbers 1304 and 1310 have previously been excluded (or in other words they are no longer remaining in the potential pool of numbers for the first division) but number 1305 has now moved from a blank number to the potential pool of winning numbers and joins number 1303 in this pool.

Snapshot 4 in FIG. 4 shows the sequence of the last three entries labelled A, B and C in order to show the sequence. Entry A is recorded against number 1300 and is thus not relevant to the process. Entry B is recorded against number 1309, which had also previously been excluded from the pool of first division numbers, and hence is not relevant to the process. However entry C is the second selection of number 1305 and this excludes 1305 from the pool of potential winning numbers leaving only number 1303 as the only remaining potential winning number, in the first division pool, and thus number 1303 can be declared the winner and the process can be stopped. In fact it is preferred that the lottery engine will refuse to accept any further entries at this point, and will declare the winning entry.

Where the transaction engine receives voice calls or text messages the receiving number(s) can be taken off-line to prevent any further entries, or, if the rules permit, subsequent entries can be directed to the next lottery.

FIG. 5 shows and overview of the transaction process, showing the remote entry from a number of different sources, through to a transaction engine, which stores information in a client and transaction database. It shows that one of the entries could be from a mobile telephone or from a landline using an interactive voice recognition system (labelled as "IVR Call Processor"). It shows a separation between the transaction engine and the lottery engine. It shows the transaction engine creating a transaction record, which is then passed to the lottery engine. The accounting function has been omitted from this flow chart. Once a winner is found, communication will come from the lottery engine back to the transaction engine to stop any further bets or defer those bets for a future lottery. The transaction engine can then call information on the winning entry from its database, and communicate back via the appropriate channel to the winner.

Figure 6:
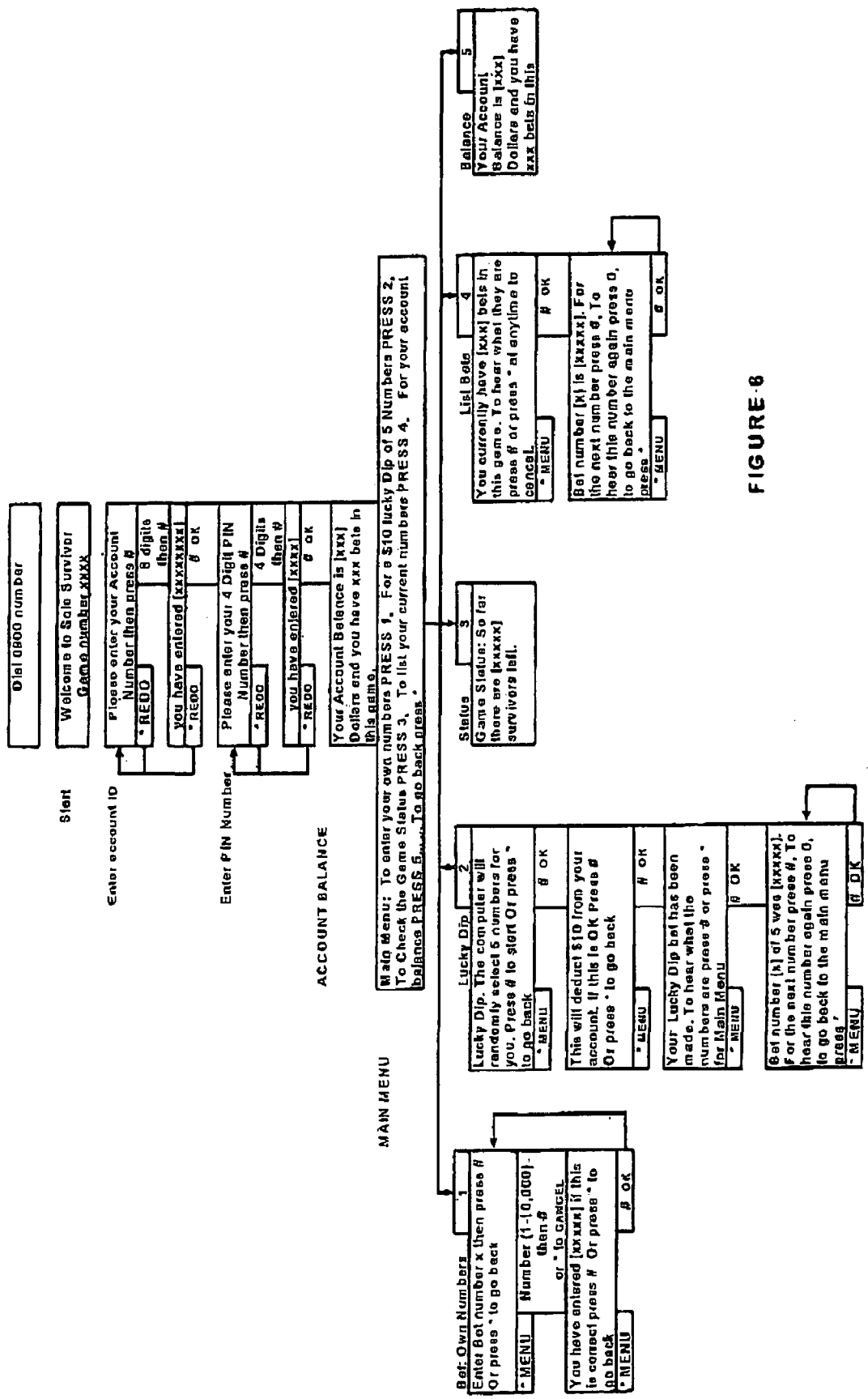
FIG. 6 is a flow chart for an interactive voice recognition system enabling a person to enter the lottery through their telephone.

FIG. 6 shows a flow chart for a channel based on interactive voice recognition, and shows a sequence of steps if a caller uses a voice line from a landline or mobile telephone to enter the competition. This solution assumes that the customer will have a telephone betting account which can be topped up from time to time, and which can be drawn upon to pay for bets. It also has provision for the user to enter their own number, or to select a lucky dip where the system will generate a number of random numbers to be entered into the competition.

FIGS. 7–10 show a simulation of a horse race based on a selection of any one of ten numbers. FIGS. 7, 8 and 9 show the same screen on a computer monitor, in different stages of the "horse race". This simulation can be viewed by the operator, but it is unlikely that this simulation would actually be shown to customers during the course of the so-called "horse race" otherwise entrants would be able to know which horse to back. FIG. 7 shows the screen at the start, FIG. 8 shows the screen after 15 entries have been made, and at this time horses 1, 3, 6, 8 and 9 are in the race as possible winners. All other horses have been scratched from the race. Horse number 6 which is recorded as "no jockey" in this simulation is still a valid entry. In FIG. 9 the race has been completed, horse 6 has now been chosen 7 times, and is thus out of the race. Only horse 1 remains with a single hit, and thus is the winner. From the last screen shown in FIG. 9 it is apparent that horse 8 was neck and neck with horse 1 until horse 8 was chosen a second time at which point it was eliminated from the competition and horse 1 declared the winner.

This is also apparent from FIG. 10 which shows the call log, showing the sequence of calls as they come in based on the date and time stamp, showing that horse 8 was chosen a second time and at that point horse 8 was eliminated from the race leaving only horse 1 as the winner.

EXAMPLE 1

In this example it is assumed that all numbers from 1–1299 and all numbers from 1311–1,000,000 had already been excluded, by more than one participant selecting each of those numbers.

When we say that a number is excluded from the potential winning pool, we propose that this information is not publicised, and that all the processing, is kept confidential by the lottery engine, other than the possibility of some form of statistics being published, for example the lottery engine might define the size of the potential pool of winning numbers, indicating the quantity (but not the identity) of any numbers that have been chosen less than two times or not chosen at all. By publicising this information, at defined intervals or perhaps even having a countdown, participants may be encouraged to enter the competition in the final stages, as they select or try to guess a number that has not been chosen by anyone else.

Instead of recording the number of entries in the form of a spreadsheet (which we have used simply for the purpose of illustration) it is envisaged that the lottery engine will utilise at least two database files, the first file recording information about participants, and the second file storing information about the pool of potential numbers.

In the case of the second database, it is envisaged that this database will have at least two fields per record, one being the number of the record (or in other words a number between 1 and n, so that the database has n records storing each number in a separate record), and at least the second field of each record stores the number of bits against that number. It is envisaged that this process will involve a simple counter, which can be incremented each time a particular number for example number 1306 in FIG. 4 is chosen by a participant, in this case number 1306 was chosen by five separate participants, so that this field will be incremented until it shows five hits. By this means it is possible for the database to have a complete list of all of the available numbers in the lottery, and show the number of times they were chosen. In its simplest form, the lottery engine could cheek the entire database, and select only those records that returned an entry in the count field of less than two (i.e. zero or one) and then return a report of how many numbers fall into category zero and how many fall into category one. The competition could then be allowed to continue, and the database sampled again until this number had reduced.

In the example shown in FIGS. 1–4, the competition continues until the records continuing count zero had disappeared, and the records containing count one are reduced to a single record which is then declared to be the winning number.

EXAMPLE 2

It is possible to vary the rules of the competition to stop the competition after a defined number of entries have been recorded, or after a defined time, or after some other event, and the database then analysed to apportion the pool of prize money (less any operating expenses or profits for the promoters) between the numbers chosen.

It is also possible that the system may be cut off at a particular date or time, and then run in a "virtual mode" live on television so the winner is technically selected on the spot. This would allow people to watch the process happen on live television.

One way this could be done would be to stop any other entries from participants, and to use a random number generator to populate the numbers, until all but one number was eliminated from the competition. That would enable the count down process to be observed, and maintain the random nature of the competition, whilst allowing the competition to run until there was a single winner. Other variations are possible. This "virtual mode" has the advantage that the computer could use a random number generator and generate a large number of hits, so that the process could be completed within a defined "television window" so that it fitted within time frame was allowed for the competition. In watching simulations of the invention, with a random number generator, many numbers are eliminated really quickly at the start of the competition, but the entire process slows down as the system comes closer and closer to only a few numbers remain the competition as potential winners. This would enable the competition to run on a weekly basis in a similar fashion to Lotto, so that the competition could enable entrants to enter up to perhaps one hour before the competition is to be "drawn", and the process run in virtual mode from them on. It would be possible to actually vary the speed or frequency of the hits so that the process could actually be controlled to match the viewers expectations, and the suspense could be drawn out until there was only two numbers remaining, and then . . . a winner is declared.

For example it may be sensible then to exclude all of the records returning a count zero (not having been chosen by anyone) look then at the number of records returning a count one and to declare those numbers division one winners, and to apportion the prize money between them, or to allow for a number of separate divisions, for example division one made up of the records returning count one, division two made up of records returning count two and division three made up of records returning count three, and so on However the difficulty with his approach is that unlike normal lottery, there may be a large number of numbers with count one, if the competition is stopped too early. If the competition is allowed to continue for at least 2n entries, then the number of prize winners in division one will be reduced significantly, but then the number of prize winners in division two (if this is made up of count two) will be very large, with the number of potential winners in division three or division four being significantly smaller.

The difficulty with suggesting divisions three or division four, based on count three or count four, is that is possible for participants to influence the outcome. It is very easy for a participant, or group of participants to knowingly enter the same number in order to give that a ranking in group three or four or five, but it is virtually impossible for a group of participants to collude together and enter numbers that have not been chosen by the other members of the group, or by any of the other potential participants, as participants will not normally know the entries made by other people.

Some participants will try and choose lucky numbers, whilst others will deliberately try not to choose lucky numbers on the assumption that other people will be drawn to those numbers. Some people will choose prime numbers, some will have a preference for odd numbers, some may choose numbers based on the ages or birthdays of their family members. Some people will believe that they can ascertain a pattern in the numbers likely to be selected by a group of individuals, but so long as a participant maintains his entry secret, then it will be difficult for another participant to deliberately attempt to exclude that number by trying to repeat it. On the contrary, the second or subsequent participant will endeavour to win by choosing a number that he or she believes will not have been chosen by anyone else and is unlikely to be chosen by anyone else during the course of the competition.

EXAMPLE 3

It is preferred that the lottery engine is capable of receiving information from participants preferably by telephone, or by email, or direct keying of numbers at a kiosk, or through a keypad associated with an interactive digital television, via an SMS message from a cellphone, or some other mechanism in which the participant can communicate directly with the interface device used to accept and then buffer entries prior to them being inserted into the lottery engine.

For example in the case of an entry via a touch-tone telephone keypad using an 0900 number, the rules of the competition will have been advertised, and the participant will know that if they dial that 0900 number they will be charged a fixed price, perhaps $1 per entry (this is better than charging on a time basis) and that they will then be given a brief message, this could simply be a recorded message that says "cost of entry in this competition is $1 to be debited against your telephone account, your telephone account number will be used as your identity number, once you have chosen your number this will be read back to you, and we will provide you with a pin number, which you may wish to write down in confirmation of this transaction."

Note that the system can be designed to accept caller ID, and if caller ID is switched off, it may then have a recorded message, which says "Your telephone number has not been recognised. Please enter your telephone number before proceeding with his competition, as your telephone number serves to identify you for the purpose of this competition."

"Please now enter a number between 1 and 1,000,000, if you choose a low number you must preface it with zeros so that your entry comprises seven digits. For example if you choose the number 7 you must enter 0000007".

The interface mechanism will then read back to the customer their caller ID; the number they have chosen and their serial number or pin number. This serial number or pin number is preferably a random number or pseudo-random number which also includes a check sum derived from their caller ID (or from some other part of the entry, perhaps a portion of their telephone number and a portion of their number entry, but in such a way that it is difficult for others to decipher this). Thus the return message to the participant would be on the following lines:

"Your caller ID is 649 486 7110.
"Your selected number for the competition is 983718.
"Your pin number for this entry is 6793219."

In this example, the last digit 9 is a check sum made up of the sum of the last four digits of the telephone number (7110).

If a customer fails to record their pin number, and they happen to win the competition, then the rules of the competition can say that if the identity of the person at that telephone number is not confirmed by the appropriate pin number, the prize will be allocated to the person who pays the telephone account (as that person's account will have been debited with the cost of entry). The promoter may wish to vary a rule such as this, in some cases the promoter may prefer to issue some form of email, or printed or other receipt. However it is envisaged that the system will best be used via telephones, or some form of keypad, and whilst it is preferable that this system be adopted using the 0900 model, or a charge for SMS messages (in which case it nay be preferable to use word entries or pseudo-word entries rather than numbers, so that entries could be made up of any combination of letters or in fact letters and numbers) the charge can be made to the telephone user's account using the 0900 system whether the originating call is from a landline or from a mobile phone).

This voice based entry, which combines the customer using a landline or mobile telephone to speak with an interactive voice recognition system is shown in more detail in the flow cart of FIG. 6. In this example it is assumed that the customer will maintain a telephone betting account, rather than paying via a 0900 number or b-party billing. In this case the interactive voice recognition system will prompt the user to respond in a number of ways, and in the event that the customer wishes to enter their own number it is preferable that the customer then uses the telephone key pad, as the system can recognise a touch tone number entry.

EXAMPLE 4

In this example it may be preferable to require participants to pre-register, for example registering with an entity that allows for telephone betting such as the TAB (the Totalizer Agency Board in New Zealand, or in NSW, Australia) and opening a telephone account, paying money into that account so that the telephone account can be debited each time the participant enters a new number. It is unlikely there would be any restriction on the number of entries per participant, the total cost of entries (and amount left in the telephone account) being the barrier for the number of times that participant has entered the competition. Telephone entry could then be via a local number or toll free number (1-800 number)

EXAMPLE 5

Entry by email or by logging onto a web-site—the participant may pre-register and pre-purchase the right to entry (e.g. by paying by credit card). They can then enter the next competition either by sending an email in a defined format containing their identity (email address) and the number they have chosen. The number could for example be in the header line. The entry engine could respond by sending an email as proof of entry and issuing a PIN or receipt number for that transaction. The competition would continue as per example 1, except that the winner could be notified by email.

EXAMPLE 6

Entry from a mobile phone by the Short Messaging System (SMS) or the Web Application Protocol (WAP) or other messaging service—in this case the participant may either pre-register and pre-purchase the right to entry (e.g. by paying by credit card) or agree to be part of B-party billing (where the cost of entry is charged to the customer's mobile phone account). The customer can then enter the next competition either by sending a message using SMS or other format containing their identity (mobile phone number which is typically embedded in the message) and the number they have chosen. In the case of a SMS message the message could contain only the number they have chosen—on the preferred assumption that there is only one number per message (to simplify processing and charging). The entry engine could then acknowledge the entry and send a receipt or PIN by return message to the customer's mobile phone. The competition would continue as per example 1, except that the winner could be notified by SMS or other messaging protocol, or by a voice call to that mobile phone number.

EXAMPLE 7

Similarly the customer could be invited to enter the competition at a Point of Sale (POS) terminal or at an Automatic Teller Machine (ATM), or at a kiosk, or gaming machine. This assumes that the merchant operating the POS terminal or the Bank operating an ATM is legally permitted to conduct such a transaction. At the time of making a purchase by credit or debit card (or withdrawing finds from an ATM machine) the customer could be asked if they wanted to participate in a competition "to win (say) One Million Dollars—each entry cost one dollar, just punch in a number between one and one million". If they chose to proceed they could then punch in the chosen entry on the number keypad of the POS terminal or the ATE Their entry could be tied to details of their credit or debit card, so that they could be notified if they are a winner. In this case the POS terminal or ATM could print details of their entry and receipt of payment onto their sales or banking receipt.

This leads to the possibility that if conducting such a lottery over a point of sale terminal is lawful, then retailers could use their EFTPOS machines to sell entries to the lottery, and receive a commission for each entry made through their terminal. The system would record the terminal of entry, so that the retailer could receive a commission at the end of the lottery.

An alternative version of this type of EFTPOS entry could be a product or service promotion in which a s service station chain could invite customers to enter a give away if they were to purchase at least say $20 of petrol, allowing them one free entry to the competition once they have paid for the petrol using a credit card or EFTPOS card, In fact the credit card or EFTPOS card could serve as their user identity, as part of the purchase transaction and as part of the entry transaction, so that the user having entered a number of their choice through the EFTPOS terminal, or having asked the EFTPOS terminal to select a number at random could have that entry stored against their EFTPOS card, or credit card number. This would enable the lottery promoter to then notify the customer via their credit card or EFTPOS statement, or even with the permission of their credit card or EFTPOS merchant, tag their file so that the next time they use their credit or EFTPOS card for a payment transaction the EFTPOS terminal could communicate to the customer that they had won a prize in that particular give away, and need to return to a service station, preferably the service stations where they entered, to collect their prize.

EXAMPLE 8

In a computer simulation of this invention using a random number generator to simulate the entries and entry cost of $1.00 per number chosen for a first division pay out of $1000.00 where contestants are assumed to have chosen a number between one and one thousand, the total take is usually between $5000.00 and $7000.00. Analysis of the simulation shows that most numbers are chosen at least 3 times and some as many as 10 times.

EXAMPLE 9

An internet style lottery based on this invention to rival the Irish Sweepstake or other large National Lotteries could have entries at say US$10.00 for each number chosen from a pool of ten million numbers, say the range from 1 to 10,000,000. A first prize of US$100 Million, a second prize of US$10 Million (for the runner up—the person who had chosen number 1305 the first time but was eliminated by entrant C when 1305 was chosen for the second time and allowed 1303 to be the first division winner). A third prize of US$5 Million could be awarded to entrant C (the person who eliminated number 1305, and caused the competition to close). Other smaller prizes of say US$10,000.00 could be awarded to every 100,000$^{th}$ entry (a prize pool of 100× US$10 k=US$1 Million). This makes a total prize distribution of US$116 Million, Minimum collection before the competition closes is (2n-1)× ticket price=a minimum US$200 Million-US$10.00, but based on our simulations the estimated collection will be closer to US$500 Million.

EXAMPLE 10

The invention cm also be used for a product or service promotion. For example a product give away in association with a radio station. Callers can be invited to choose a unique number between 1 and 100 or 1 and 1000, with prize give aways based on the final winner using the computer system described above.

EXAMPLE 11

In this example we have chosen a range of ten numbers. FIGS. 7, 8 and 9 show the promoter's screen, which will not be accessible to participants. It is described as a horse race simulation so that the system supervisor, or programmer can monitor what happens. The system corresponds with the basic overview of FIG. 5. However, in this case n equals 10 and they have been labelled horses 1 through 10. The screen shots in FIGS. 7, 8 and 9 are actual screen shots from a simulation based on a random number generator rather than actual entries. The log bag been enabled, and the simulation has been run in slow mode in order to capture the screen shots. The log of FIG. 10 shows the duration of the process, which is not much more than one minute, Even with this small size of n=10 the actual number of hits is quite large, and thus even with a $1 bet cost and a pay out of $10, the actual gross profit after paying out the $10 prize is $55 as shown on final screen of FIG. 9.

Advantages

The preferred embodiments of this invention making use of remote entry such as by telephone or email or SMS, enable a lottery system to be run at low cost, as it does not need to issue pre-printed tickets or receipts (although simple printed receipts are possible as in the ATM or POS examples), as the entry and the billing process can be handled for example through participant's telephone accounts. The cost of entry can be debited to a participant's telephone account or they can have pre-registered and built up a credit with the lottery organiser. This reduces the barrier to entry to a competition, particularly where the competition may be televised, as participants may respond directly to a television advertisement, by entering the competition using their home telephone or mobile phone. In some cases users may have chosen a particular number which they have stored on their mobile phone, and which they use each time they enter a new lottery (by storing such numbers, it would be foolish to enter more than once in a particular lottery, as the second entry of that number would void the participant's chances of a division one win).

By using the caller's telephone number, credit card, email address, mobile phone number etc., (from the mode of entry) as the participant's identification, it is also possible for the organiser or promoter of the competition to quickly contact the winner once a winning number has been revealed by the lottery engine.

It is also an advantage of the preferred embodiments of this invention that the final winning number is chosen by the interaction of the participants various entries cancelling out entries and not by a selection process that could be the subject of fraud or interference or built in bias—e.g. the selection of numbered balls in LOTTO.

In addition the lottery engine itself can be rendered substantially tamperproof, as participants will not be able to gain direct access to the lottery engine, as their entries will be received by an interface device which once having accepted the entry will then terminate the call (or contact with) the participant, and only then forward their entry and ID to the stack for processing an entry into the lottery engine. By this means the outcome of the lottery will be truly operator independent and thus risk of interference, or bias on the part of the operator can be minimised if not completely removed to make their lottery engine free of bias or distortion that might otherwise be introduced by one or more of the operators of the system.

Variations

The examples show a single transaction engine and a single lot engine, Although it is possible to combine both processes in a single computer we prefer not to do this as it might compromise security. However, it is possible to have a number of separate transaction engines feeding data to a common lottery engine. For example a single high value lottery may be run with contestants able to enter by a variety of routes at the same time—in which case an entry by email would be timed stamped, as would an entry by telephone or ATM, each time stamped entry would be forwarded to the lottery engine and processed in turn based on each entry's time stamp. Bach time stamp should also show the identity of the transaction engine so that when a winning entry (and any other runner up entries) are determined at the close of the lottery, the lottery engine can communicate with the relevant transaction engine to identify the winner(s).

In FIG. 6, showing the IVR flow chart we have included the possibility that an entrant could allow the system to chose a "lucky dip" in which the system would generate one or more random numbers as the persons' entry into the competition. In the claim we refer to "the participants are invited to select at least one number" but the participant need not enter the number themselves, as one option is for the participant to allow the system to use a random number generator to select the number from a defined range of n numbers, for that participant.

It will be appreciated that the parameters of the lottery can be varied in many different ways, for example the potential pool of numbers 1 to n may be varied depending upon how quickly the lottery is to be filled up, the size of the likely prize pool, the potential population having access to the lottery and whether or not the lottery is to be run in combination with any other promotions, or whether any spot prizes are to be awarded. For example spot prizes could be awarded to each ten-thousandth entrant, or for the participant's place in the queue, as an example a spot prize might be awarded for the participant number 9999, or participant 88,888 (to reflect the Chinese preference for the lucky number 8) or some other group of numbers, reflecting the ethnic mix of the participants, or the promoters desire to encourage rapid participation in the lottery.

The lottery need not have a monetary prize but could be used as a promotional tool to choose the winner or winners of a prize such as a car, stereo, or other item. In such a case a number of smaller lotteries night be used, e.g. "choose a number between 1 and 100".

Finally various other alterations or modifications may be made to the foregoing without departing from the scope of this invention.

The invention claimed is:

1. A computerised lottery having at least one computer system for recording entries and determining one or more winners, in which participants are invited to select at least one number from a defined range of n numbers, where n is a number, and to register each participant's selection with the computer, the computer recording at least an identity or contact details of the participant and the number selected by the participant, rules of a competition being such that participants are aware that the competition will run until a winner is declared, but that more than one selection of a same number by more than one participant or entry will prevent said number from being chosen for a primary prize without eliminating said number from future participant selection, the competition running until either: (a) a defined time has expired to determine one or more winners based on the participants who had selected numbers that other participants had not selected; or (b) until all but one of the numbers have been selected two or more times, and only one number remains having been selected by only one participant, with the one number remaining that has been selected by only one participant being a final number and being declared a winning number, and the participant having chosen said winning number being identified as a winner.

2. The computerised lottery as claimed in claim 1, wherein a registration process includes time and date recordal of each entry.

3. The computerised lottery as claimed in claim 1, wherein the computer system includes a transaction engine and a lottery engine.

4. The computerised lottery as claimed in claim 3, wherein the lottery engine is capable of maintaining (a) a register of all of the possible numbers to be used in the defined lottery, and (b) a record of the number of times each number is chosen; and the lottery engine has means for identifying an outcome when only one number remains having been selected by only one participant.

5. The computerised lottery as claimed in claim 3, wherein the lottery engine includes at least one database.

6. The computerised lottery as claimed in claim 3, wherein the transaction engine is separate from the lottery engine and passes registered entries sequentially to the lottery engine.

7. The computerised lottery as claimed in claim 3, wherein an input to the transaction engine receives remote entries from any one or more of (a) a telephone keypad, or (b) an SMS message from a mobile phone, or (c) an email, or (d) an entry direct to a website, or (e) an entry at an ATM, or (f) an entry at a POS terminal, or (g) an entry direct to a kiosk or computer terminal at a retail outlet.

8. A computer program for conducting a lottery in which participants are invited to select at least one number from a defined range of n numbers, where n is a number, and to register their selection with a computer running the program, the program adapted to record at least an identity or contact details of the participant and the number selected by the participant, and to separately record a number of times each number within the range of n numbers is chosen by participants, the program allowing a competition to run until (i) all but one of the numbers have been selected two or more times with numbers selected by participants two or more times remaining eligible for additional participant selection, and (ii) only one number remains having been selected by only one participant with the one number being a final number and being declared a winning number.

9. A method of conducting a lottery, in which participants are invited to select at least one number from a defined range of numbers between one and n, where n is a number, to register their selection with a computer system, the computer system being capable of recording at least an identity or contact details of the participant, the number selected by the participant, and a date and time of an entry, rules of a competition being such that participants are aware that the competition will run until a winner is declared, but that more than one selection of the same number by more than one participant or entry will prevent said number from being chosen as a primary prize without eliminating said number from future participant selection, the competition running until either a defined time has expired, or until all but one of the numbers have been selected two or more times and only one number remains having been selected by only one participant with said one number being declared a winning number, and the participant having chosen said winning number being identified as a winner.

10. A method of conducting a lottery comprising:
   a) selecting an element from a predefined pool of elements, wherein selection of the element does not eliminate the selected element from future selection such that all the elements of the predefined pool of elements are available for selection during the entire lottery;
   b) registering the selection of the element;
   c) eliminating any element selected more than once from eligibility as being classified as a primary winning element; and
   d) continuing the selecting and registering of elements until a predetermined event occurs, wherein after the predetermined event occurs, elements selected only once are classified as winning selections.

11. The method of claim 10, wherein the predetermined event is a passage of a preselected amount of time.

12. The method of claim 10, wherein after the predetermined event occurs, elements are randomly selected until only one element remains having been selected only once, the one element remaining having been selected only once being identified as the primary winning element.

13. The method of claim 10, wherein the predetermined event is a determination that only one element remains having been selected only once.

14. The method of claim 10, wherein participants are invited to make selections, wherein the participants are aware of only the element selections made by that participant and are unaware of the element selections made by other participants.

15. The method of claim 10, wherein prior to the occurrence of the predetermined event, participants are invited to make selections of the elements, and wherein after the occurrence of the predetermined event, a computer is used to make random selections of the elements until only one element remains that has been selected only once, the element selected only once identified as the primary winning element.

16. The method of claim 15, wherein the predetermined event is a passage of a preselected amount of time.

17. The method of claim 10, wherein registering the selection of the element includes recording at least an identity or a contact detail of an entity making the selection and the element selected by that entity.

* * * * *